United States Patent
Shao et al.

(10) Patent No.: US 9,470,931 B2
(45) Date of Patent: Oct. 18, 2016

(54) METHOD FOR MANUFACTURING DISPLAY PANEL AND TRANSFER PLATE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yong Shao, Beijing (CN); Weixin Meng, Beijing (CN); Chengtan Zhao, Beijing (CN); Xu Chen, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/425,374

(22) PCT Filed: Jun. 26, 2014

(86) PCT No.: PCT/CN2014/080811
§ 371 (c)(1),
(2) Date: Mar. 3, 2015

(87) PCT Pub. No.: WO2015/113367
PCT Pub. Date: Aug. 6, 2015

(65) Prior Publication Data
US 2016/0011451 A1 Jan. 14, 2016

(30) Foreign Application Priority Data
Jan. 29, 2014 (CN) .......................... 2014 1 0043325

(51) Int. Cl.
*H01L 27/12* (2006.01)
*G02F 1/1337* (2006.01)
(Continued)

(52) U.S. Cl.
CPC ......... *G02F 1/13378* (2013.01); *G02F 1/1337* (2013.01); *G02F 1/133351* (2013.01); *G02F 1/1303* (2013.01)

(58) Field of Classification Search
CPC ........................ G02F 1/1378; G02F 1/133351
See application file for complete search history.

(56) References Cited

U.S. PATENT DOCUMENTS

| 8,593,600 B2 | 11/2013 | Jeong et al. |
| 2007/0199853 A1 | 8/2007 | Jow |
| 2014/0057200 A1 | 2/2014 | Lin et al. |

FOREIGN PATENT DOCUMENTS

| CN | 101097334 A | 1/2008 |
| CN | 102768439 A | 11/2012 |

(Continued)

OTHER PUBLICATIONS

International Search Report and Written Opinion of the International Searching Authority with Notice of Transmittal of the International Search Report and Written Opinion of PCT/CN2014/080811 in Chinese, mailed Oct. 29, 2014.

(Continued)

*Primary Examiner* — Tracie Y Green
(74) *Attorney, Agent, or Firm* — Collard & Roe, P.C.

(57) ABSTRACT

A method for manufacturing the display panel and a transfer plate are disclosed, the method includes: fabricating a color resin layer and a first alignment film (21) in this order on a first mother board (2) corresponding to at least two display panels; applying the alignment liquid coated onto the surface of the transfer plate (1) onto the surface of the first mother board (2), so that the first alignment film (22) is formed on the first mother board (2); the transfer plate (1) comprises only one transfer zone correspondingly covering the entire first mother board (2).

6 Claims, 5 Drawing Sheets

(51) Int. Cl.
*G02F 1/1333* (2006.01)
*G02F 1/13* (2006.01)

(56) References Cited

FOREIGN PATENT DOCUMENTS

| | | |
|---|---|---|
| CN | 103439816 A | 12/2013 |
| CN | 103777384 A | 5/2014 |

OTHER PUBLICATIONS

Chinese Office Action of Chinese Application No. 201410043325.8, mailed Oct. 29, 2015 with English translation.
Second Chinese Office Action of Chinese Application No. 201410043325.8, mailed Feb. 29, 2016 with English translation.
Third Chinese Office Action in Chinese Application No. 201410043325.8, mailed Jul. 25, 2016 with English translation.
English translation of the International Preliminary Report on Patentability and Written Opinion of the International Searching Authority of PCT/CN2014/080811, issued Aug. 2, 2016.

METHOD FOR MANUFACTURING DISPLAY PANEL AND TRANSFER PLATE

CROSS REFERENCE TO RELATED APPLICATIONS

This application is the National Stage of PCT/CN2014/080811 filed on Jun. 26, 2014, which claims priority under 35 U.S.C. §119 of Chinese Application No. 201410043325.8 filed on Jan. 29, 2014, the disclosure of which is incorporated by reference.

TECHNICAL FIELD

The embodiment of present invention relates to a method for manufacturing a display panel and a transfer plate.

BACKGROUND

In the field of display techniques, especially the technical field of liquid crystal display, at a side of the substrate for the liquid crystal display (for example, the color filter substrate and the array substrate) adjacent to the liquid crystal layer, an alignment film of a certain orientation and pre-tilt angle is always provided, so that the liquid crystal molecule at the surface of the substrate for display forms regular arrangement and creates predetermined tilt angle with respect to the substrate for display. Due to the fact that the alignment film is generally made of Polyimide (PI), the alignment film is also called a PI layer in abbreviation. Photosensitive resin plate (APR) is mainly used for the roller coating using alignment solution during the PI film manufacture process, that is, the APR plate is mainly used for transferring the alignment solution onto the glass substrate so as to form uniform alignment solution coating.

During the process for making a liquid crystal display panel, several display panels would be formed on the mother board, then cutting process is used to obtain the final single display panel of required dimensions. Before the formation of display panel on the mother board, the above-mentioned PI film is created.

SUMMARY

The method for manufacturing a display panel as well as the transfer plate provided by at least one embodiment of the present invention as well can improve the printing quality of the alignment film and also to improve the productive capacity of alignment film printing.

The transfer plate provided by at least one embodiment of the present invention comprises only one transfer zone correspondingly covering the entire mother board.

At least one embodiment of the present invention provides a method for manufacturing a display panel, the method comprises the process of fabricating the color resin layer and the first alignment film in this order on the first mother board corresponding to at least two display panels; and fabricating the first alignment film comprising: applying the alignment liquid coated on the surface of the transfer plate onto the surface of the first mother board, so that an alignment film is formed on the first mother board; the transfer plate comprising only one transfer zone correspondingly covering the entire first mother board.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention. In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
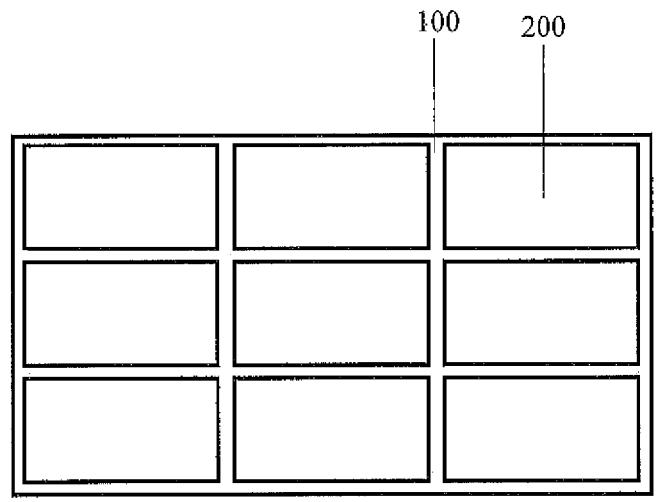
FIG. 1 is a structural schematic view of an APR plate.

As illustrated in FIG. 1, an APR plate for printing the alignment film mainly comprises a base plate 100 and at least two APR projected plates 200 secured onto the base plate 100; each of the projected plates 200 corresponds to several display panel patterns on the mother board, to transfer the alignment solution adhered to the APR projected plate 200 onto the correspondent display panel zones on the mother board; two adjacent APR projected plates 200 have a gap of a certain width therebetween.

In actual production process, distinct mother boards of the same size are usually used for manufacturing products of different sizes (for example, comprising substrates of different sizes) simultaneously; hence, the display panel patterns on the mother boards of the same size are usually distinct from each other. Therefore, as for different types of display panels, different types of APR plates are required, which would reduce the productive capacity of the alignment film printing line. In addition, the manufacturing precision and printing precision of the APR plate are readily influenced by many factors, and it is difficult to make the APR plate preformed with patterns to be completely coincide with the patterns of the glass substrate, and since such a difficulty occurred during the printing always causes shift between the PI film formed on the mother board with respect to the preset position, shift between the PI film on the display panel and the sealant is caused, which causing product discard.

At the same time, each of the APR plates has a high cost, the price thereof is also higher. Furthermore, numerous types of the APR plates existing in the production line also makes it difficult to supervise, there are risks where APR plate corresponding to the production of B type of product is adopted when A type of product would be produced.

The method for manufacturing a display panel as well as the transfer plate provided by at least one embodiment of the present invention as well can improve the printing quality of the alignment film and also improve the productive capacity of alignment film printing.

Firstly, an introduction will be provided about the flow chart of the manufacturing process for the display panel (TFT-LCD) provided by the embodiment of present invention, and normally, three processes will be successively performed on the manufactured color filter substrate or array substrate, that is, an alignment process, liquid crystal instilling and curing cell-assembling process, as well a cutting process. The alignment process mainly comprises fabricating an alignment film on the mother board comprising the color filter substrate and the array substrate.

The mother board may be one for fabricating an array substrate, also may be one for fabricating a color filter substrate, each of the mother boards comprises several substrates side by side, and these substrates have identical or distinct dimensions. Such a mother board is generally a glass substrate or a substrate of other materials, and may be a substrate during or before the aforesaid cutting process. During the subsequent processes, the mother board (or the combination of the same) will be cut off so as to obtain several substrates separated from each other.

Figure 2:
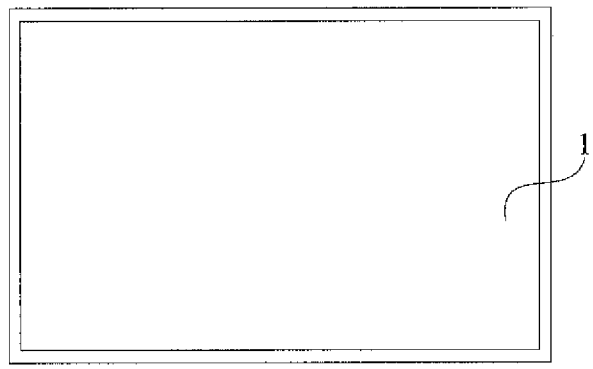
FIG. 2 is a schematic top view of a transfer plate provided by the embodiment of present invention.

As illustrated in FIG. 2, the transfer plate 1 provided by at least one embodiment of the present invention comprises only one transfer zone correspondingly covering the entire mother board, that is, such a transfer zone corresponds to all the substrates on the mother board.

Figure 3:
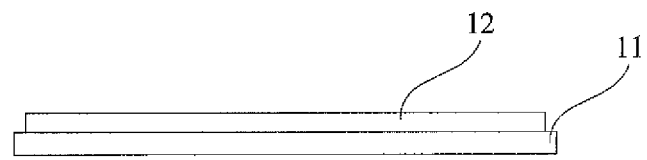
FIG. 3 is a schematic section view of the transfer plate provided by the embodiment of present invention.

Referring to FIG. 3, the transfer plate comprises a base plate 11 and a projected plate 12 secured onto the base plate 11; the projected plate 12 corresponds to the transfer zone 1 illustrated in FIG. 2.

For example, the dimension of the projected plate 12 is equivalent to that of the mother board, and the shape thereof is also analog to the shape of the mother board.

For example, the transfer plate is a photosensitive resin plate (APR plate).

Figure 4:
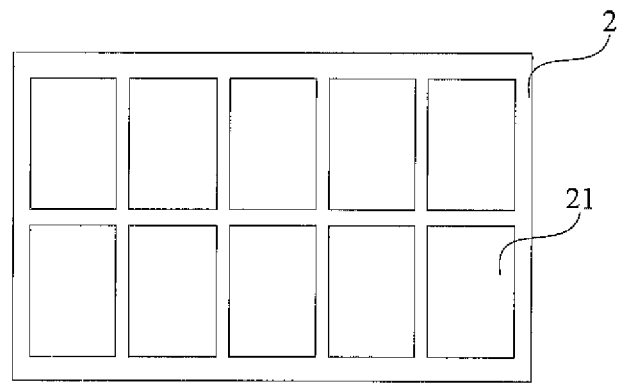
FIG. 4 is a structural schematic view of a mother board provided by one embodiment of the present invention.
Figure 5:
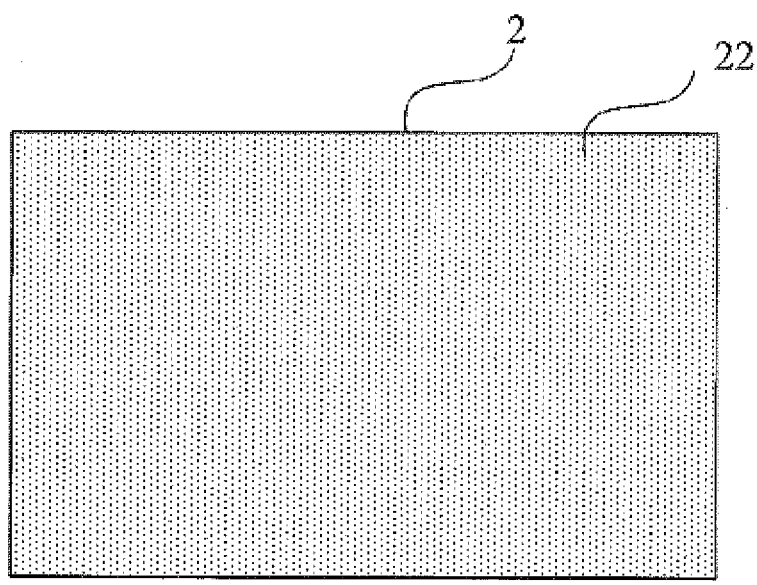
FIG. 5 is a structural schematic view of the mother board provided by one embodiment of the present invention formed with an alignment film.

At least one embodiment of the present invention provides a method for manufacturing the alignment film on a mother board. As illustrated in FIG. 4, the transfer plate 1 is utilized to coat the alignment liquid onto the mother board 2 corresponding to at least two color filter substrates 21, so that the alignment liquid on the mother board 2 is formed into an alignment film 22 located on the mother board 2 as illustrated in FIG. 5; as illustrated in FIG. 2, the transfer plate 1 comprises only one transfer zone correspondingly covering the entire mother board 2.

Figure 6:
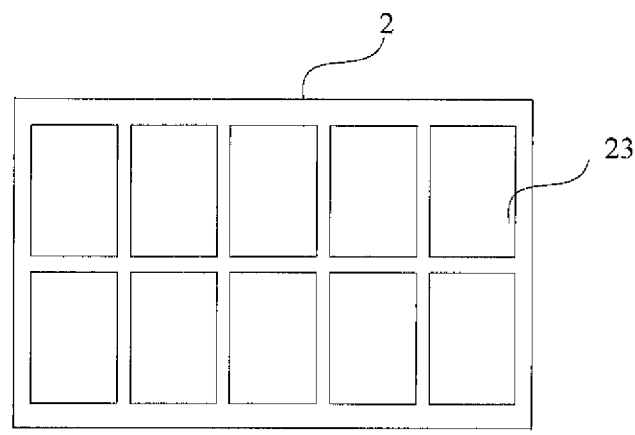
FIG. 6 is a structural schematic view of a mother board provided by another embodiment of the present invention.
Figure 7:
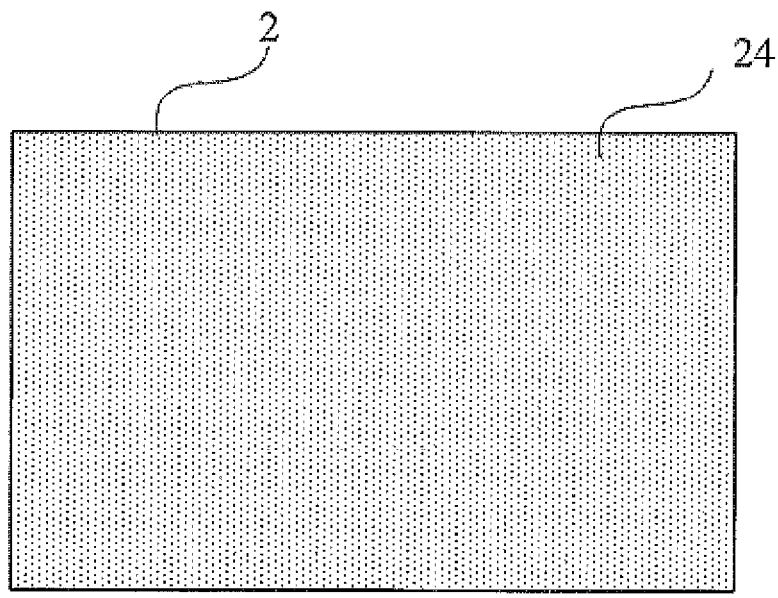
FIG. 7 is a structural schematic view of the mother board provided by another embodiment of the present invention formed with an alignment film.

At least one embodiment of the present invention provides another method for manufacturing the alignment film on a mother board. As illustrated in FIG. 6, the transfer plate 1 is utilized to coat the alignment liquid onto the mother board 2 corresponding to at least two array substrates 23, so that the alignment liquid on the mother board 2 is formed into an alignment film 24 located on the mother board 2 as illustrated in FIG. 7; as illustrated in FIG. 2, the transfer plate 1 comprises one transfer zone correspondingly covering the entire mother board 2.

With the methods for manufacturing an alignment film provided by aforesaid embodiments, the alignment film located on individual color filter substrates and the alignment film located on individual array substrates are manufactured, respectively. During this manufacturing process, the transfer plate comprising one transfer zone correspondingly covering the entire mother board, as illustrated in FIG. 2, is adopted to transfer the alignment liquid onto the mother board corresponding to the color filter substrate or array substrate illustrated in FIG. 4 or 6, so that the array substrate or color filter substrate on the entire mother board would be formed with an alignment film illustrated in FIG. 5 or 7 thereon, that is, before the cutting process, the periphery region of the array substrate or color filter substrate is each formed with alignment film, thus avoiding the problem of shift between the alignment film and the array substrate or color filter substrate, enhancing the printing quality of the alignment film. Such a transfer plate may be used in the process of forming the alignment film on a display panel of optional dimensions on a mother board of identical dimension, thus it's possible to improve the productive capacity of printing the alignment film.

Figure 8:
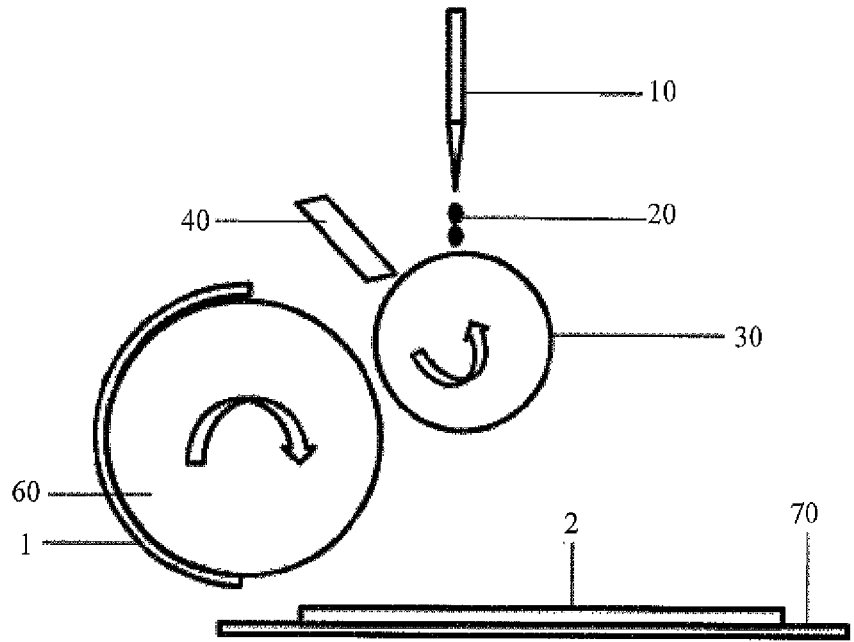
FIG. 8 is a structural schematic view of a device for manufacturing the alignment film provided by the embodiment of present invention.

The method for manufacturing the alignment film provided by aforesaid embodiments may be implemented through the device illustrated in FIG. 8.

Referring to FIG. 8, a dispenser 10 instills the PI liquid 20 onto the anilox roll 30 at the position contacting with the blade roll 40, the blade roll 40 butters the PI liquid 20 on the anilox roll 30 evenly. The anilox roll 30 contacts with the plate cylinder 60 carrying the transfer plate 1 illustrated in FIG. 2, and transfers the PI liquid onto the transfer plate 1; then through the transfer plate 1, the PI liquid is printed onto the surface of the mother board 2 on the base platform 70 to from a PI film (not illustrated in FIG. 8).

Hereinafter, the method for manufacturing a display panel provided by the embodiment of present invention will be illustrated in detail.

Figure 9:
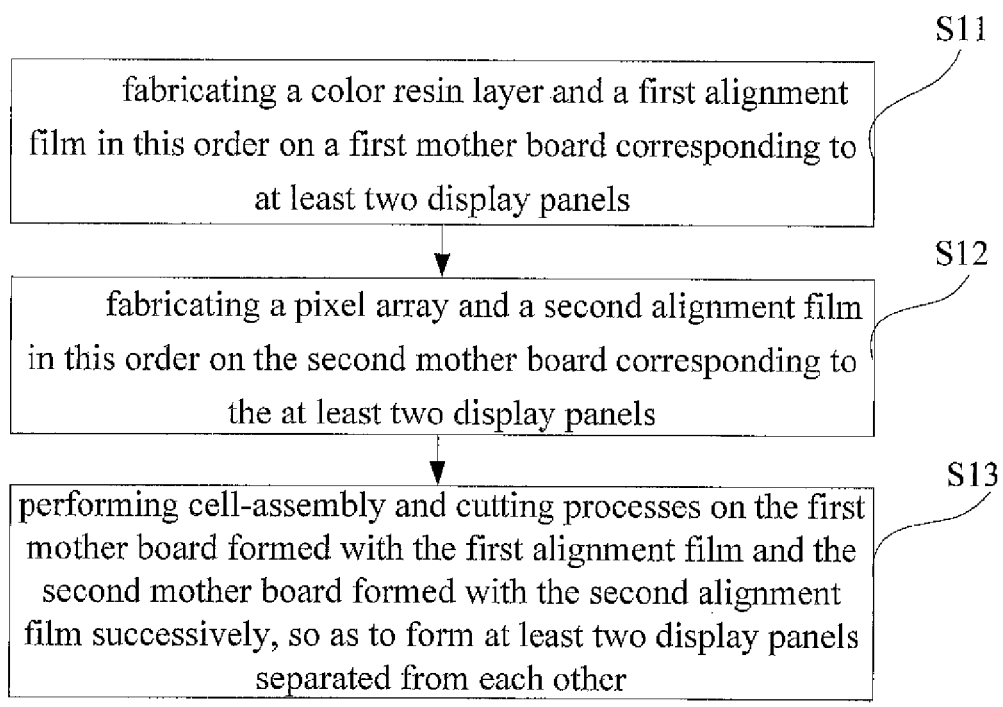
FIG. 9 is a schematic view showing the flow chart for manufacturing the display panel provided by the embodiment of present invention.

Referring to FIG. 9, the method for manufacturing a display panel provided by at least one embodiment of the present invention comprises steps as follows:

S11, fabricating a color resin layer and a first alignment film in this order on a first mother board corresponding to at least two display panels;

S12, fabricating a pixel array and a second alignment film in this order on the second mother board corresponding to the at least two display panels;

S13, performing cell-assembly and cutting processes on the first mother board formed with the first alignment film and the second mother board formed with the second alignment film successively, so as to form at least two display panels separated from each other.

For example, manufacturing the first alignment film comprises: applying the alignment liquid coated onto the surface of the transfer plate onto the surface of the first mother board, such that an alignment film is formed on the first mother board; the transfer plate comprises only one transfer zone correspondingly covering the entire first mother board.

For example, manufacturing the second alignment film comprises: applying the alignment liquid coated onto the surface of the transfer plate onto the surface of the second mother board, such that an alignment film is formed on the second mother board; the transfer plate comprises only one transfer zone correspondingly covering the entire second mother board.

Figure 10:
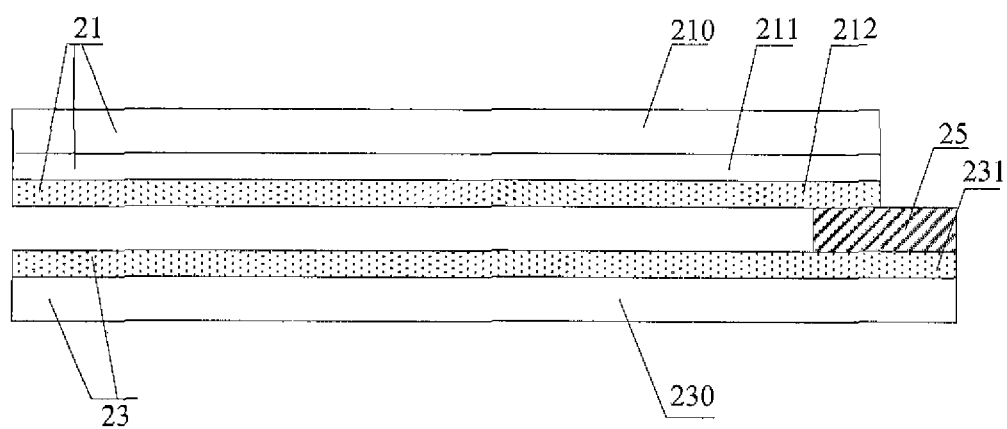
FIG. 10 is a partial structural schematic view of the display panel provided by the embodiment of present invention.

FIG. 10 illustrates a partial cross sectional schematic view of the formed display panel. This display panel comprises a color filter substrate 21 and an array substrate 23 arranged oppositely to each other; the color filter substrate 21 comprises a base substrate 210, a black matrix 211, and a first alignment film 212; the array substrate 23 comprises an base substrate 230 and a second alignment film 231; the periphery region between the color filter substrate 21 and array substrate 23 is cell-assembled and cured through the sealant layer 25.

The periphery region of the color filter substrate 21 is then cut off, and the periphery region of the array substrate 23 is exposed; due to the top layer of the array substrate 23 is the second alignment film 231, the second alignment film 231 is exposed and covers the circuit below the second alignment film 231.

Due to the fact that the adoption of the transfer plate illustrated in FIG. 2 causes that the circuit within the periphery region of the display panel is covered by the PI, which influences signal input. For example, after the formation of at least two display panels mutually separated, the method further comprises removing the alignment film exposed after the cutting of the periphery region of the individual display panel, so as to expose the circuit below the alignment film.

For example, removing the alignment film exposed after the cutting of the periphery region of the individual display panel may be done as follows:

Immersing the periphery region of the display panel for removing the alignment film into a container containing alignment-film removing solution for 20 to 30 minutes, so as to sufficiently remove the alignment film.

For example, the alignment-film removing solution may be EP 4 or other alignment-film removing solutions know in this art etc. The periphery region of the display panel for removing the alignment film has a height of, for example, 4-6 mm.

Subsequently, placing the display panel after being immersed in the alignment-film removing solution into the de-ionized water and rinsing the same for 5 to 7 minutes, for example, 8 minutes.

For example, the height of the de-ionized water is 3-4 times of that of the periphery region.

Placing the display panel after being processed by the de-ionized water in a drying chamber for 8 to 12 minutes, for example, 10 minutes, and drying the display panel in a drying chamber at 60-70° C.

At least one embodiment of the present invention provides a transfer plate and a method for manufacturing alignment film on a mother board, the transfer plate comprises only one transfer zone correspondingly covering the entire mother board. The method comprises: the transfer plate is adopted to paste the alignment liquid onto the mother board corresponding to at least two color filter substrates or array substrates, so that the alignment liquid forms an alignment film on the mother board; the transfer plate comprises one transfer zone corresponding covering the entire mother board, so that the array substrate or color filter substrate on the entire mother board are formed with alignment films thereon, that is, before the cutting, the periphery regions of the array substrate or color filter substrate are formed with alignment films, thus avoiding the problem of shift between the alignment film and the array substrate or color filter substrate, enhancing the printing quality of the alignment film. Such a transfer plate may be used in the process of forming the alignment film on a display panel of optional dimensions on a mother board of identical dimension, thus it's possible to improve the productive capacity of printing the alignment film.

The foregoing is merely exemplary embodiments of the invention, but is not used to limit the protection scope of the invention. The protection scope of the invention shall be defined by the attached claims.

The invention claimed is:

1. A method for manufacturing a display panel, comprising:
    fabricating a color resin layer and a first alignment film in this order on a first mother board corresponding to at least two display panels;
    wherein fabricating the first alignment film comprises: applying an alignment liquid coated onto a surface of the transfer plate onto a surface of the first mother board, so that an alignment film is formed on the first mother board; and
    wherein the transfer plate comprises only one transfer zone correspondingly covering the entire first mother board,
    wherein the method further comprising:
        fabricating a pixel array and a second alignment film in this order on a second mother board corresponding to the at least two display panels;
        wherein fabricating the second alignment film comprises: applying the alignment liquid coated onto the surface of the transfer plate onto a surface of the second mother board, so that an alignment film is formed on the second mother board;
        wherein the transfer plate comprises only one transfer zone correspondingly covering the entire second mother board,
    wherein the method further comprising:
        performing cell-assembly and cutting processes on the first mother board formed with the first alignment film and the second mother board formed with the second alignment film successively, so as to form at least two display panels separated from each other,
        wherein after forming the at least two display panels separated from each other, the method further comprising removing the alignment film exposed after cutting in a periphery region of each display panel to expose a circuit below the alignment film,
        wherein removing the alignment film exposed after cutting in the periphery region of each display panel comprising:
            immersing a side of the display panel for removing the alignment film into a container containing an alignment-film removing solution for 20 to 30 minutes;
            placing the display panel after being immersed in the alignment-film removing solution into de-ionized water and rinsing the same for 5 to 7 minutes; and
            placing the display panel after being processed by the de-ionized water in a drying chamber for 8 to 12 minutes to dry the display panel.

2. The manufacturing method according to claim 1, wherein the transfer plate comprises a base plate and a projected plate secured onto the base plate; the projected plate corresponds to the transfer zone.

3. The manufacturing method according to claim 1, wherein the transfer plate is a photosensitive resin plate.

4. The manufacturing method according to claim 1, the periphery region of the display panel for removing the alignment film has a height of 4-6 mm.

5. The manufacturing method according to claim 1, the height of the de-ionized water is 3-4 times of that of the periphery region.

6. The manufacturing method according to claim 1, the drying chamber is at a temperature of 60-70° C.

* * * * *